(12) United States Patent
Abbas

(10) Patent No.: US 6,514,116 B2
(45) Date of Patent: Feb. 4, 2003

(54) BODY-MOUNTED GAME CALLER APPARATUS AND METHOD

(75) Inventor: Frederick M. Abbas, Houghton Lake, MI (US)

(73) Assignee: A-Way Hunting Products, Inc., Beaverton, MI (US)

(*) Notice: Subject to any disclaimer, the term of this patent is extended or adjusted under 35 U.S.C. 154(b) by 183 days.

(21) Appl. No.: 09/805,078

(22) Filed: Mar. 13, 2001

(65) Prior Publication Data

US 2002/0187723 A1 Dec. 12, 2002

(51) Int. Cl.$^7$ ............................................... A63H 33/40
(52) U.S. Cl. ........................ 446/202; 446/203; 446/207; 84/402; 84/403
(58) Field of Search ................................ 446/176, 202, 446/203, 207, 208, 213, 397, 209; 224/148.2, 901.8; 84/402, 403, 410, 319, 327, 328, 329

(56) References Cited

U.S. PATENT DOCUMENTS

| 2,961,135 | A | | 11/1960 | Hughes, Jr. |
| 3,866,592 | A | | 2/1975 | Carella |
| 4,280,299 | A | | 7/1981 | Oka |
| 4,586,482 | A | | 5/1986 | Di Pietro |
| 4,656,746 | A | | 4/1987 | Gillespie |
| 4,733,808 | A | | 3/1988 | Turner, Jr. et al. |
| 4,852,287 | A | | 8/1989 | Martin |
| 4,862,625 | A | * | 9/1989 | Dolan |
| 4,888,903 | A | * | 12/1989 | Knight |
| 4,915,660 | A | | 4/1990 | Overholt, Sr. |
| 5,035,390 | A | | 7/1991 | Sanders |
| 5,111,981 | A | | 5/1992 | Allen |
| 5,211,596 | A | | 5/1993 | Bradshaw |
| 5,244,430 | A | | 9/1993 | Legursky |
| 5,431,590 | A | | 7/1995 | Abbas |
| 5,445,551 | A | * | 8/1995 | Ady |
| 5,664,360 | A | | 9/1997 | Conway |
| 5,820,000 | A | | 10/1998 | Timberlake et al. |
| 5,885,125 | A | * | 3/1999 | Primos |
| 5,964,054 | A | | 10/1999 | Galfidi, Jr. |
| 5,988,469 | A | * | 11/1999 | Musacchia |

FOREIGN PATENT DOCUMENTS

| DE | 666 306 | 10/1938 |
| FR | 385 095 | 12/1907 |

OTHER PUBLICATIONS

Bow–Scope, American Sports "All we sell is Fun!".

* cited by examiner

Primary Examiner—Derris H. Banks
Assistant Examiner—Bena B. Miller
(74) Attorney, Agent, or Firm—Brooks & Kushman P.C.

(57) ABSTRACT

An apparatus 10 and method for calling game animals when a user is hunting with a bow or a gun. The apparatus operates hands-free and includes a flexible conduit 24 that extends between a mouthpiece 12 and a game-attracting call assembly 30 that is operable when the user ingests air through the mouthpiece 12. The call assembly 30 includes an air-actuated sound-producing member 34 which is attached to the user's clothing. The apparatus 10 permits the user to initiate a game-attracting call without discernable movement of his or her upper body.

11 Claims, 2 Drawing Sheets

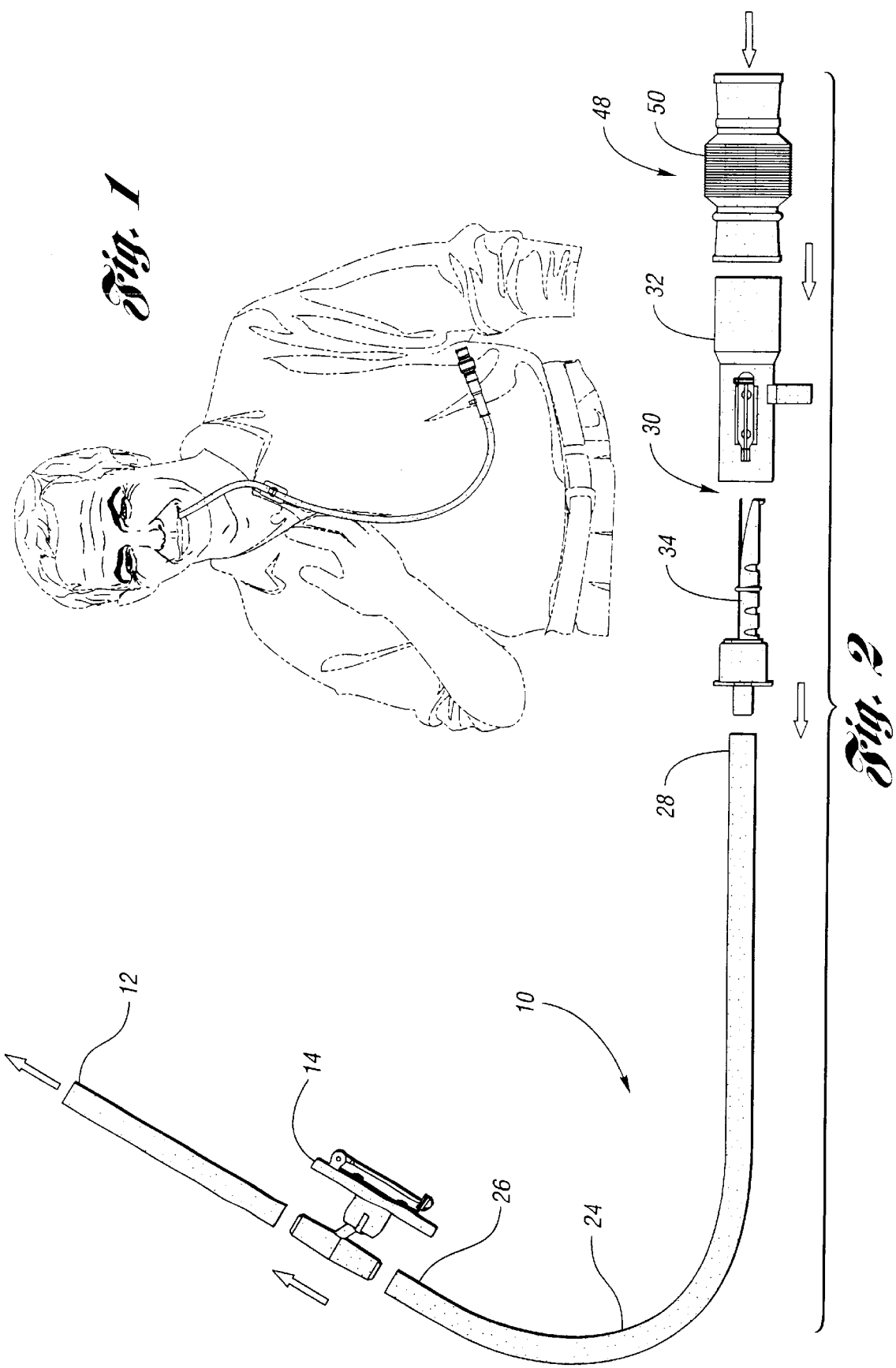

BODY-MOUNTED GAME CALLER APPARATUS AND METHOD

BACKGROUND OF THE INVENTION

1. Field of the Invention

This invention relates to a device used in hunting, and more particularly to a game caller that is mountable on the clothing of the hunter.

2. Background Art

Devices to attract wild game animals such as, but not limited to deer, moose, turkey, and elk to a site where a hunter awaits are well known. One class of these devices produces sounds, such as antlers rubbing together, or the call of another game animal, to which other game animals respond. Some of these devices are held on a cord around the user's neck but are hand held while in use. Other sound producing devices are known which operate when stepped upon by the hunter.

A problem with these devices is that the hunter must initiate some movement to operate them. Such movement is impractical or impossible when the hunter is maintaining an archery bow in a fully drawn position or when the hunter is training his gun sights on a target. Also, such movement often alerts the prey to the hunter's presence and provokes the animal to flee. Even when using devices such as those which can be continually held in the mouth and thus do not require any obvious movement to operate, it is impractical for the hunter to hold one of these devices in his or her mouth for an extended period of time.

Illustrative of the prior art is U.S. Pat. No. 5,111,981 issued on May 12, 1992; and commonly owned U.S. Pat. No. 5,431,590 which issued on Jul. 11, 1995.

SUMMARY OF THE INVENTION

An object of the present invention is to provide a hands-free body-mounted game caller system that can be used by the hunter who may use a weapon, such as, but not limited to, a gun, a crossbow, or a bow.

It is an object of the present invention to provide an apparatus of the type described above with which a hunter can produce a game animal call, without obvious movement, while holding a weapon in a drawn or cocked position.

Another object of the invention is to provide a game-attracting call assembly that provides for the hunter an opportunity to generate one from a choice of realistic tones, each of which may be chosen to attract, for example, fawn, doe, buck, and a dominant buck.

A still further object of the invention is to provide a game caller that emanates soft tones, thereby eliminating the need to muffle a call against the body in order to lower the volume of the call.

Another still further object of the invention is to provide a body-mounted game caller that includes an extendable member that can be moved between a contracted and extended configuration, thereby permitting the hunter to generate a call suitable for long distance "rut" calling and mid-to-short range "social" calling.

It is a further objective of the invention to provide a body-mounted game caller that is activated upon inhalation so that the device will not freeze in cold weather.

Additionally, it is an object of the invention to provide a body-mounted game caller wherein the reed will not stick in hot weather.

Yet another object of the invention is to provide an automatic shut-off which prevents advertent generation of a call or a undesirable note in the event that the user becomes overly stimulated.

It is also an object of the invention to provide a rapid and facile mounting system whereby the body-mounted game caller can be readily, yet securely, attached to the user.

To meet these objects, the present invention discloses an apparatus for calling game animals when a user is hunting with an archery bow or a gun. The apparatus comprises a mouthpiece for insertion into the user's mouth to enable the user to apply a vacuum thereto. A connector assembly has a base that is mountable below the neck of the user on the clothing thereof. A sheath is pivotably connected to the base, with an outlet port that communicates with the mouthpiece and inlet port. A flexible conduit having a downstream end is detachably attached to the inlet port of the sheath. A game-attracting call assembly is connected to the upstream end of the flexible conduit. The assembly is operable when the user ingests air through the mouthpiece, the connector assembly, and the conduit.

The call assembly comprises a main body and an air-actuated sound-producing member. The call assembly is attached to the user's clothing. The body-mounted game caller allows the user to initiate a game-attracting call without discernable movement of his or her upper body.

These and other objects, features, and advantages of the present invention are readily apparent from the following detailed description of the best mode for carrying out the invention when taken in conjunction with the accompanying drawings.

BRIEF DESCRIPTION OF THE DRAWINGS

FIG. 1 is a perspective quartering view illustrating an apparatus for calling game animals, and how it may be mounted upon the hunter's clothing;

FIG. 2 is an exploded perspective view of the apparatus, including a mouthpiece, a connector assembly, a flexible conduit, and a game-attracting call assembly;

DETAILED DESCRIPTION OF THE PREFERRED EMBODIMENT(S)

Figure 3:
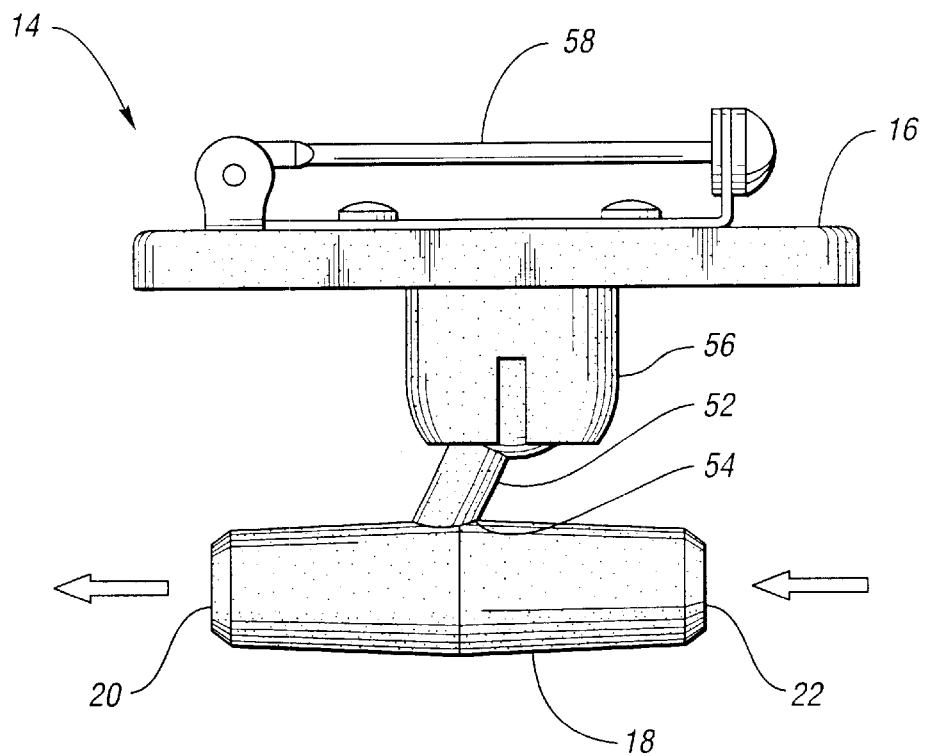
FIG. 3 is a perspective view of the connector assembly.

Turning first to FIGS. 1–2 of the drawings, there is depicted the apparatus 10 for calling game animals when a user is hunting, both as deployed in operational use (FIG. 1) and as an exploded view (FIG. 2). The apparatus 10 include a mouthpiece 12 for insertion into the user's mouth to enable the user to apply a vacuum thereto. A connector assembly 14 having a base 16 (FIG. 3) is mountable below the neck of the user on the clothing thereof. It will be appreciated that in some embodiments, a mouthpiece 12 may form an integral part of the connector assembly 14. A sheath 18 is pivotally mounted to the base 16. An outlet port 20 of the sheath 18 communicates with the mouthpiece 12 and an inlet port 22.

Continuing with particular reference to FIG. 2, a flexible conduit 24 has a downstream end 26 that is detachably attached to the inlet port 22 of the sheath 18. An upstream end 28 of the flexible conduit 24 is attached to a game-attracting call assembly 30. The assembly is operable when the user ingests or draws air through the mouthpiece 12 or sheath 18, the connector assembly 14, and the conduit 24.

Figure 4:
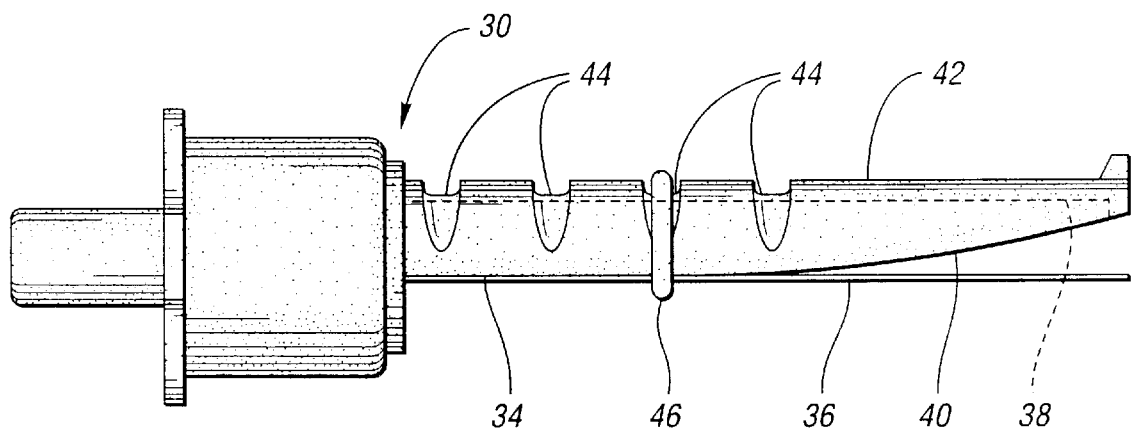
FIG. 4 is a quartering perspective view of the game-attracting call assembly.

Continuing now with primary reference to FIG. 4, it will be seen that the call assembly 30 includes a main body 32 (FIG. 2) and an air-actuated sound producing member 34 that includes a vibratable reed 36. The call assembly in use is attached to the hunter's clothing.

By inhaling air, the user may initiate a game-attracting call without discernable movement of his or her upper body.

As best indicated in FIG. 4, the apparatus 10 prefer ably includes a call assembly 30 that has a main body 32 (FIG. 2) which has a vibratable reed 36 disposed longitudinally therein. The call assembly 30 comprises a trough 38 that extends within the main body 32. An inner concave portion 40 of the trough 38 accommodates the reed. An outer convex portion 42 of the trough 38 defines a plurality of grooves 44. An O-ring 46 may be seated in one of the plurality of grooves 44 and secures the vibratable reed 36 to the trough 38, thereby enabling the reed to vibrate at a user-selected pitch.

Returning to FIG. 2, the apparatus 10 further includes an optional extender 48 which is telescopically engaged with the main body 32 of the call assembly 30. Preferably, the extender 48 has a bellows portion 50 that expands and contracts to create a desired variation in pitch and amplitude of the game-attracting call initiated when the hunter inhales. The optional extender 48 and the bellows portion 50 permit a versatile extension for long distance ("ruts") and mid-to-short range ("social") callings.

Continuing with primary reference to FIG. 3, the connector assembly 14 further includes a shaft 52 having a first end 54 that is rigidly attached to the sheath 18. The shaft 52 has a second end 56 that is pivotally attached to the base 16 of the connector assembly 14. This pivotable arrangement permits the apparatus 10 to nestle snugly with relation to the hunter's clothing, increases wearer comfort, and tends to reduce unwanted snagging. As indicated in FIG. 3, the shaft 52 and the sheath 18 are connected at an angle (θ) so that the sheath 18 is inclined in relation to the shaft 52.

The apparatus 10 can be quickly and easily mounted upon the wearer, or the body of the wearer by the means 58 for securing (FIG. 3) the apparatus. Equivalent means for attaching are considered to include a pin such as that depicted by reference numeral 58, a press stud, a button, a VELCRO® attachment, and the like.

In use, the vibratable reed depicted in FIG. 4 is capable of generating multiple, e.g. four different tones from which the hunter may choose by suitable deployment of the O-ring 46 in the grooves 44. When the O-ring is positioned toward the left side of FIG. 4, a tone that is desired to attract the attention of a dominant buck is generated. When the O-ring is seated in the adjacent groove, a tone suitable to attracting a buck is generated. A pitch suited to attracting doe is generated when the O-ring is seated in the next groove. When the O-ring is seated in the outermost groove, a tone suited to attract a fawn is generated.

To deploy the O-ring 46 in the groove 44 of choice, the game-attracting call assembly 30 is slid longitudinally outwardly from the main body 32, thus exposing the grooves 44. The O-ring can then readily be seated in any groove selected by the user.

Though in FIG. 1 the game-attracting call assembly 30 is shown as being mounted below the shoulder of the user, such a mounting location is by no means necessary. The call assembly 30 could, for example, be mounted on any other part of the user or his clothing that the hunter desires.

The device 10 also has the attribute of eliminating an accidental "squawk" which an excited hunter is apt to make.

Further, the apparatus 10 will never freeze up in cold weather because in its preferred method of use, it is activated upon inhalation. Thus, moist breath does not pass through the call assembly 30. Nor will the reed 36 stick in hot weather.

In use, the volume of sound emanating from the game-attracting call assembly 30 is controlled by regulating the flow of air appropriate to the situation along the relatively narrow inside diameter flexible conduit, thus allowing the hunter to keep both hands on this weapon. The multiple (as illustrated, 4), settings (fawn, doe, buck, and dominant buck), permits the user to generate realistic sounds. If a hunter calls out to a deer, the hunter desires to convince the listener that the hunter is a deer. The more convincing the sound, the more likely the attraction.

The flexible conduit 24 is preferably made from plastic, or a flexible rubber or other elastomeric tubing that may be opaque or translucent. For example, the conduit 24 may have a one-quarter inch outside diameter and three-sixteenths inch inside diameter. As is best shown in FIG. 2, the conduit 24 has a downstream end 26 attached to the connector assembly 14 and an upstream end 28 attached to an air-actuated sound producing member 34. The conduit 24 is cut to a length, typically between about fifteen and twenty-four inches, but in practice, could have a relaxed length of several inches to many feet. In mounting, the conduit 24 is not stretched to the point that it might deform and affect the passage of air therethrough.

Thereafter, the hunter can draw air through the conduit 24 by inhaling or exhaling through the mouthpiece 12. As shown in FIG. 4, a vibratable reed 36 is held in place in the main body 32 by an inner reed holder or trough 38 so that a game attracting call, preferably a grunt or bleat of a deer, is produced in the main body when the user causes air to pass through the conduit 24.

It is known that all deer are social and curious by nature. They communicate aurally with one another, regardless of status or dominance. A deer's social aurally communication is soft and subtle, so much so that many hunters fail to hear the sounds that deer use by which to communicate. This secretive soft and subtle whisper of sound is emulated by the disclosed invention. Nevertheless, the disclosed device has the ability to generate sounds that range upwardly to the level of any other long range deer call (loud and deep), thus creating a versatile, multi-faceted game-attracting call apparatus that can be used during the whole season pre-peak, and post-rut, rather then only during the rut season.

The tones generated on the apparatus 10 range from a social (subtle), 5 yards, to a louder rutting 100 plus yards. The caller controls the volume level from low to high merely by regulating the flow of air. Assembly is relatively easy, as are the O-ring adjustments.

In operational use, the following methodology, among others, has been shown to be effective:
A. With no deer in sight, three short grunts, bleats, or other sounds are produced that are spaced a few seconds apart, every 20 to 25 minutes until a deer is attracted;
B. With a deer in sight, a soft call is made, keeping the tone low and short. Each grunt should be singular. Calling is stopped if the deer responds;
C. Selectively aim at the desired target and deploy the weapon of choice.

It should be understood that the game animal caller of the present invention can be used with various hunting weapons, such as bows, non-compound bows and crossbows.

In an alternative embodiment, the apparatus 10 may be effectively deployed without a separate mouthpiece 12. In such alternative embodiments, the connector assembly 14 may be provided with an extended outlet port 20 (FIG. 3) that can be inserted into the hunter's mouth. It is also possible that the apparatus 10 may be suitably deployed without the connector assembly 14 or the mouthpiece 12. In such an embodiment, a downstream end 26 of the flexible conduit 24 may be inserted directly between the hunter's lips.

It should be also understood that while the forms of the invention herein shown and described constitute preferred embodiments of the invention, they are not intended to illustrate all possible forms thereof. Finally, the words used are words of description rather than limitation, and various changes may be made without departing from the spirit and scope of the invention disclosed.

Thus, the apparatus 10 of the present invention is a completely hands free system that is mounted on the clothing of the user, regardless of whether he or she is a gun or a bow hunter. Different realistic tones can be generated at the user's option. Because the game-attracting call assembly 30 is activated by inhalation, the assembly 30 will not freeze up in cold weather. Its ability to generate soft tones eliminates having to muffle the assembly 30 against the body in order to lower the volume of sound produced.

What is claimed is:

1. An apparatus for calling game animals when a user is hunting, comprising:
    a mouth piece for insertion into the user's mouth to enable the user to apply a vacuum thereto;
    a connector assembly having a base that is mountable on the user or on the user's clothing, a sheath pivotally connected to the base with an outlet port that communicates with the mouthpiece, and an inlet port;
    a flexible conduit having an downstream end detachably attached to the inlet port of the sheath, and an upstream end;
    a game-attracting call assembly attached to the upstream end of the conduit that is operable when the user inhales air through the mouthpiece, the connector assembly and the conduit, the call assembly comprising:
        a main body, and
        an air-actuated sound-producing member,
        the call assembly being attached to the user or the user's clothing, whereby the user may initiate a game-attracting call without discernible movement of his or her upper body.

2. The apparatus of claim 1 wherein the call assembly comprises a main body having a vibratable reed disposed therein.

3. The apparatus of claim 2 wherein the call assembly further comprises a trough extending longitudinally within the main body, the trough having an inner concave section that accommodates the reed and an outer convex portion that defines a plurality of grooves.

4. The apparatus of claim 3 wherein the call assembly further comprises an O-ring that is seated in one of the plurality of grooves and secures the reed to the trough, the O-ring being securable to one of the plurality of grooves, thereby enabling the reed to vibrate at a user-selected pitch.

5. The apparatus of claim 1 further including an extender telescopingly engaged with the main body of the call assembly.

6. The apparatus of claim 5 wherein the extender has a bellows portion that expands and contracts to create a desired variation in pitch and amplitude of the game-attracting call.

7. The apparatus of claim 1 wherein the connector assembly further includes a shaft having a first end rigidly attached to the sheath and a second end that is pivotally attached to the base.

8. The apparatus of claim 7 wherein the shaft and the sheath are connected at an angle ($\theta$) so that the sheath is inclined in relation to the shaft to facilitate a nestling configuration of the connector assembly in relation to the user's body.

9. An apparatus for calling game animals when a user is hunting, comprising:
    a connector assembly having a sheath pivotally connected to a base that is mountable on the user or on the user's clothing, the sheath being provided with an outlet port that is inserted into the user's mouth;
    a flexible conduit having a downstream end detachably attached to an inlet port of the sheath;
    a game-attracting call assembly attached to the conduit that is operable when the user inhales air through the conduit, the call assembly comprising:
        an air-actuated sound-producing member,
        the call assembly being attached to the user's clothing, hereby the user may initiate a game-attracting call without discernible movement of his or her upper body.

10. A method for generating a game-attracting call, using a game-attracting call assembly which includes a vibratable reed, using the apparatus of claim 1 the method comprising the steps of:
    determining a desired pitch of sound to be produced by the passage of air in relation to the vibratable reed, by seating an O-ring in a groove of the assembly appropriate to the desired pitch;
    assembling the game-attracting call assembly by positioning an air-actuated sound-producing member within a main body thereof;
    attaching a flexible conduit to the game-attracting call assembly;
    inserting the other end of the flexible conduit in the user's mouth; and
    applying a negative pressure to the flexible conduit so that air is drawn across the vibrating reed and sound is produced thereby.

11. The method of claim 10 further comprising the steps of:
    attaching a connector assembly to flexible conduit;
    attaching a mouthpiece to the connector assembly;
    mounting the connector assembly to the hunter or to his clothing;
    the mouthpiece being adapted for an insertion between the lips of the hunter so that air can be inhaled across the vibrating reed of the game-attracting call assembly, the flexible conduit, the connector assembly, and the mouthpiece.

* * * * *